US006706392B2

(12) United States Patent
David et al.

(10) Patent No.: US 6,706,392 B2
(45) Date of Patent: Mar. 16, 2004

(54) ADHESIVE PACKAGING TAPE

(75) Inventors: Wolfgang David, Hamburg (DE); Stefan Röber, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/262,650

(22) Filed: Sep. 30, 2002

(65) Prior Publication Data

US 2003/0143393 A1 Jul. 31, 2003

(30) Foreign Application Priority Data

Jan. 31, 2002 (DE) ......................................... 102 03 885

(51) Int. Cl.$^7$ ............................................... B32B 27/30
(52) U.S. Cl. ............................... 428/355 AC; 428/336; 428/337; 428/341; 428/219; 428/220
(58) Field of Search ....................... 428/355 AC, 337, 428/341, 336, 219, 220; 525/418, 451; 526/318, 319, 329.7; 528/271, 306

(56) References Cited

U.S. PATENT DOCUMENTS

| 2,680,111 A | | 6/1954 | Brown ....................... 260/34.7 |
| 3,470,366 A | | 9/1969 | Geller ......................... 235/175 |
| 3,617,362 A | | 11/1971 | Bemmels et al. ........... 117/122 |
| 3,770,780 A | | 11/1973 | Hirsch ..................... 260/397.3 |
| 3,790,553 A | | 2/1974 | Rao et al. .................... 260/112 |
| 3,847,855 A | | 11/1974 | Dawson ..................... 260/23.7 |
| 3,900,610 A | | 8/1975 | McKenna, Jr. .............. 349/168 |
| 3,983,297 A | | 9/1976 | Ono et al. .................. 428/355 |
| 4,168,249 A | * | 9/1979 | Meyer .......................... 524/40 |
| 4,277,387 A | | 7/1981 | Jordan et al. ................ 153/350 |
| 5,662,985 A | * | 9/1997 | Jensen et al. ............. 428/195.1 |
| 6,203,913 B1 | * | 3/2001 | Kondos et al. .......... 428/423.1 |

FOREIGN PATENT DOCUMENTS

| DE | 32 07 236 A1 | 9/1983 | ............. C09J/7/02 |
| DE | 196 11 501 A1 | 9/1997 | ............. C09J/7/02 |
| EP | 0 006 571 A1 | 1/1980 | ............. C09D/5/34 |
| EP | 0 017 119 A1 | 3/1980 | ............. C09G/1/10 |
| EP | 0375 215 B1 | 2/1996 | ............. C08J/7/04 |
| EP | 0796 906 A2 | 9/1997 | ............. C09J/7/02 |

OTHER PUBLICATIONS

Handbook of Pressure Sensitive Adhesive Technology, Ed. Donatas Satas, 3$^{rd}$ Edition, Satas & Associates, Warwick, RI, 1999, pp. 411–419.
Handbook of Pressure Sensitive Adhesive Technology, Ed. Donatas Satas, 3$^{rd}$ Edition, Satas & Associates, Warwick, RI, 1999, Chapter 16, pp. 457–493.
Handbook of Pressure Sensitive Adhesive Technology, Ed. Donatas Satas, 3$^{rd}$ Edition, Satas & Associates, Warwick, RI, 1999, Chapter 21, pp. 545–566.
Handbook of Pressure Sensitive Adhesive Technology, Ed. Donatas Satas, 3$^{rd}$ Edition, Satas & Associates, Warwick, RI, 1999, Chapter 32, pp. 787–814.
Handbook of Pressure Sensitive Adhesive Technology, Ed. Donatas Satas, 2$^{nd}$ Edition, Satas & Associates, Warwick, RI, 1989, Chapter 34, pp. 767–808.
Handbook of Pressure Sensitive Adhesive Technology, Ed. Donatas Satas, 2$^{nd}$ Edition, Satas & Associates, Warwick, RI, 1989, Chapter 35, pp. 809–830.
Handbook of Pressure Sensitive Adhesive Technology, Ed. Donatas Satas, 2$^{nd}$ Edition, Satas & Associates, Warwick, RI, 1989, Chapter 36, pp. 831–863.
A. Kruse, et al., "Surface pretreatment of plastics for adhesive bonding", *J. Adhesion Sci. Technol.*, vol. 9 No. 12, pp. 1611–1621, 1995.
R.W. Andres, "Waterborne Acrylic Pressure Sensitive Adhesive for PP Carton Sealing Tapes", *European Adhesives and Sealants*, 1985.
"Acrylic adhesives are the right choice for carton sealing tapes", *European Adhesives and Sealants*, Dec. 1993.
Abstract of English language counterpart of EP 0 017 119 A1.

* cited by examiner

*Primary Examiner*—Robert Dawson
*Assistant Examiner*—Christopher M Keehan
(74) *Attorney, Agent, or Firm*—Norris McLaughlin & Marcus

(57) ABSTRACT

A solvent-free adhesive tape with a film based on polyolefins and an adhesive layer which is applied at between 10 and 45 g/m$^2$ and is prepared with a mixture comprising an adhesive acrylic dispersion acquires improved adhesive properties and increased water insensitivity by virtue of the fact that the mixture comprises a second, special acrylic dispersion, the quantitative ratio between the first acrylic dispersion and the second acrylic dispersion being between 99:1 and 90:10 and the second acrylic dispersion comprising the following components:

65–84% by weight of ethyl acrylate units
15–34% by weight of methyl methacrylate units
0.5–2% by weight of acrylic acid units
0.1–1% by weight of propyleneimine units.

11 Claims, No Drawings

ADHESIVE PACKAGING TAPE

The invention relates to solvent-free adhesive tapes with a film based on polyolefins and an adhesive based on acrylic dispersion, and to their use as adhesive packaging tape.

Solvent-based adhesive tapes with a film based on polyolefins, especially on biaxially oriented polypropylene, and an adhesive based on acrylic dispersion are known and are available from known manufacturers of adhesive packaging tapes.

A description is given, for example, in "Packaging Tapes", Stefan Roeber in Handbook of Pressure Sensitive Adhesive Technology, Third Edition, edited by Donatas Satas, Satas&Associates, Warwick, R.I., pp. 787–814. Further descriptions can be found in European Adhesives & Sealants 10 (4), 1993, 29, by G. Pedala and European Adhesives & Sealants 2 (2), 1985, 18 by R. W. Andrew.

The known adhesive packaging tapes with a film based on biaxially oriented polypropylene and an adhesive based on acrylic dispersion are used for numerous packaging tasks, especially in the sealing of cartons. In comparison to commercial adhesive tapes with adhesive based on solventborne natural rubber compositions blended with appropriate resins, the adhesive tapes with adhesive based on acrylic dispersion have the disadvantage of a sealing effect which is often unsatisfactory. This means that the sealed cartons open again a few minutes or hours after sealing. This unwanted opening generally affects not all of the sealed cartons but only a relatively small fraction, which then, however, leads to disruptions and extra work in the automatic conveying and packaging lines that are nowadays the norm. The problem occurs to an increased extent when using cartons which have been manufactured from recycled paper. For some years there has been a continual increase in the fraction of cartons made from recycled paper.

The failure of the adhesive tapes based on acrylic dispersions is caused by the inadequate tack of the adhesive to the surfaces of cartons made from recycled paper and by the stretch introduced into the adhesive tape as a result of excessive unwind force during processing. Given the sufficient lid-flap tension in the cartons, caused by the pressure of the material packed in the carton or by the tension of the packing material, which acts counter to the sealing, the adhesive tape detaches from the surface of the carton, and the carton opens.

One known means of improving the tack is to add resins to acrylic dispersions. The resins may be added in the form of an aqueous dispersion.

An overview of possible resin dispersions can be found, for example, in "Resin Dispersions", Anne Z. Casey in Handbook of Pressure Sensitive Adhesive Technology, Second Edition, edited by Donatas Satas, Van Nostrand Reinhold New York, pp. 545–566. Results of the blending of acrylic dispersions with resin dispersions are described in "Modification of Acrylic Dispersions", Alexander Zettl in Handbook of Pressure Sensitive Adhesive Technology, Second Edition, edited by Donatas Satas, Van Nostrand Reinhold New York, pp. 457–493.

The company Hercules BV proposes a mixture of acrylic dispersions (Acronal 85D, BASF), 33% by weight of resin dispersions based on a hydrocarbon resin (Tacolyn 4177) and about 4% by weight (2% based on the mixture of the aqueous dispersions) of an isocyanate crosslinker (Basonat F DS 3425X, BASF) ("Tacolyn 4177 and Tacolyn 153 Resin Dispersions, use in WBPSA technical tapes for high temperature application"; Hercules BV product information dated 06.01.1995, pages 1–4).

By this means, an improved thermal stability, improved cohesion, and improved tack to steel are obtained. The anchoring of the composition to a film of biaxially oriented polypropylene, however, is not sufficient. Moreover, sufficiently quiet and easy unwinding cannot be achieved by means of the proposed adhesives, and use of the isocyanate crosslinker results in increased effort for workplace safety, since Basonat F DS 3425X is classed as a hazardous material under German regulations and may give rise to sensitization by inhalation or skin contact and to heath damage on inhalation (Basonat F DS 3425 safety data sheet in accordance with 91/155/EEC dated 20.07.1994, BASF). The means proposed is therefore considerable for obtaining adhesive tapes with improved tack to recycled paper in conjunction with quiet and easy unwinding plus sufficient composition anchoring.

Another possibility for improving the tack to cardboard packaging made from recycled paper is described in DE 196 11 501 A1 and EP 0 796 906 A2. Here, an adhesive based on a mixture of acrylic dispersion, special resin dispersions based on hydrocarbon resins, alkoxylated alkylphenols, and, optionally, a suitable crosslinker is used.

For preparing acrylic dispersions, anionic, nonionic, and, less often, cationic or amphoteric components are used as emulsifiers. Anionic emulsifiers comprise sodium, potassium or ammonium salts of fatty acids and sulfonic acids, alkali metal salts of C 12–16 alkyl sulfates, ethoxylated and sulfonated fatty alcohols or alkylphenols.

The emulsifiers are frequently used at concentrations of 0.2–5% based on the acrylic monomers.

Owing to emulsifiers, but also to wetting agents added additionally, the dried acrylic dispersion films exhibit a more or less pronounced sensitivity to water.

The water sensitivity is frequently determined by the time taken for the dried self-adhesive composition to develop a white coloration after it has been wetted with water. In certain label applications, where great value is placed on optical qualities, the degree of whitening does play a certain part. In the case of adhesive packaging tapes, however, its significance is low. Possibly much more serious, however, is the water sensitivity or moisture sensitivity in adhesive tapes with acrylic dispersions which have been physically treated (corona/flame treatment) on both sides, when at high atmospheric humidity these adhesive tapes display a tendency for the adhesive, during unwind from the roll, to transfer to the other side. Polypropylene adhesive tapes which have been given a surface treatment on both sides are described, inter alia, by G. Pedala in European Adhesives & Sealants 10 (4), 1993, 29. Double-sided surface-treated PP adhesive tapes are on the market as low-noise adhesive packaging tapes. A description can be found, for example, in the "Handbook of Pressure Sensitive Adhesive Technology" by Donatas Satas, Third Edition, p. 797.

In many cases, however, only the reverse of the adhesive tape is subjected to corona treatment in a printing machine in order to apply flexographic printing inks to PP adhesive tapes. Suitable flexographic printing inks are, for example, the inks from the series "15 PAA" from Michael Huber GmbH, D 85551 Kirchheim-Heimstetten.

In order to have reduced water sensitivity, the literature sets out processes which start right from the preparation of the dispersion, with the selection of the emulsifiers. Thus there are emulsifiers which are sufficiently volatile at relatively high temperatures or which decompose on drying. For instance, U.S. Pat. No. 2,680,111 to United States Rubber Co. sets out ammonium soaps which are used in synthetic rubber polymerization to improve the water resistance of rubber coatings.

U.S. Pat. No. 3,847,855 to Union Carbide Corp. recommends vinyl chloride copolymer emulsions comprising ammonium salts of fatty acids. Since the migration of emulsifiers is often held responsible for the water sensitivity, the literature contains references which use copolymerizable emulsifiers in order to lessen the migration.

Through a selection of certain comonomers in acrylic polymerization it is also possible to increase the water resistance: for example, ethylene glycol dimethacrylate is proposed as a comonomer by T. Ono in U.S. Pat. No. 3,983,297 with the aim of improving the water resistance.

The known adhesive tapes unwind relatively noisily when used in practice, i.e., at unwind speeds of between 20 and 200 m/min, and lead to a deterioration in working conditions as a result of increased noise levels.

It is an object of the invention to design an adhesive tape of the type specified at the outset in such a way as to obtain markedly improved water sensitivity and at the same time to obtain quiet unwind at high unwind speeds.

This object is achieved in accordance with the invention by means of a solvent-free adhesive tape having a preferably oriented film based on polyolefins and an adhesive layer which is applied at between 10 and 45 g/m² and is prepared with a mixture of a first, adhesive acrylic dispersion and a second, special acrylic dispersion and with from 0 to 50% by weight of additives which do not alter the adhesive properties of the adhesive formed by the acrylic dispersions, the quantitative ratio of the first acrylic dispersion to the second acrylic dispersion being between 99:1 and 90:10 and the second acrylic dispersion being composed of the following components:

65–84% by weight of ethyl acrylate units
15–34% by weight of methyl methacrylate units
0.5–2% by weight of acrylic acid units
0.1–1% by weight of propyleneimine units.

For the adhesive tape of the invention, accordingly, a new way has been found to modify an existing, commercially customary, pressure sensitive adhesive acrylic dispersion, by adding conventional base materials, in such a way that the adhesive tape is suitable as an adhesive packaging tape for commercially customary cardboard packaging, owing to improved tack, and that a markedly improved water sensitivity is ensured in conjunction with quiet unwind at high unwind speeds.

The adhesive tape of the invention can further be printed without the need for a further surface treatment, such as by corona discharge, during the printing operation. The use of films based on polyolefins, preferably oriented polyolefins, have been known for a long time and is part of the state of the art.

Monoaxially and biaxially oriented films based on polypropylene are used in large amounts for adhesive packaging tapes, strapping tapes, and other adhesive tapes. Films based on oriented polyethylene or oriented copolymers containing ethylene and/or propylene units are also known. Mixtures of the various polymers can also be used for producing the films.

For producing the adhesive tapes of the invention, particular preference is given to biaxially oriented films based on polypropylene with a draw ratio in the lengthwise direction (machine direction, MD) of between 1:4 and 1:9, preferably between 1:4.8 and 1:6, and a draw ratio in the transverse direction (cross direction, CD) of between 1:4 and 1:9, preferably between 1:4.8 and 1:8.5. The moduli of elasticity achieved in the machine direction, measured at 10% elongation in accordance with ASTM D882, are normally situated between 1 000 and 4 000 N/mm². The moduli of elasticity achieved in the cross direction are likewise situated between 1 000 and 4 000 N/mm².

The thicknesses of the biaxially oriented films are situated in particular between 15 and 100 μm, preferably between 20 and 50 μm.

The biaxially oriented films can be produced on standard flat film lines, on which normally drawing is performed first in the machine direction and then in the cross direction. With this operation it is possible to set different properties in the machine and cross directions. The draw ratios in the machine direction are in particular between 1:4.5 and 1:6 (preferably from 1:4.8 to 1:5.6) and in the cross direction of between 1:7 and 1:9. By way of example, mention may be made of biaxially oriented films from Radici (Italy) with the name Radil T and from Mobil with the name BICOR OPP FILM 35 MB 250. Also known in principle are biaxially oriented films which are drawn first in the machine direction, then in the cross direction, and finally in the machine direction once again.

Biaxially oriented films are produced in both single-layer and multilayer forms. In the case of the multilayer films, the thickness and composition with the different layers may be the same, although different thicknesses and compositions are known.

Preference for the adhesive tapes of the invention is given to multilayer, biaxially oriented films based on polypropylene with a sufficiently firm bond between the layers, since delamination of the layers in the course of manufacture or use of the adhesive tape is a disadvantage.

It is also possible to use biaxially oriented multilayer polyolefin films based on polypropylene whose surfaces have a clearly perceptible mattness as compared with standard polypropylene films. By way of example, mention may be made of biaxially oriented films from Radici (Italy) with the name Radil TM and from Polinas (Turkey) with the name Pilen 225 D and from Hoechst with the name Trespaphan Mat and from Bimo (Italy): Stilan HP 32. This mattness is produced by using special copolymers or polymer blends based on polyolefins which in the course of production by means of extrusion, with specially adapted drawing conditions, lead to sufficiently great surface roughness and, accordingly, to a matt appearance.

The surfaces of the films are treated by known techniques. Preference is given to surface treatments by corona treatment and/or by flame pretreatment. An overview of the techniques of surface treatment is contained, for example, in the article "Surface pretreatment of plastics for adhesive bonding" (A. Kruse, G. Krüger, A. Baalmann, and O.-D. Hennemann, J. Adhesion Sci. Technol., Vol.9, No.12, pp.1611–1621 (1995).

The biaxially oriented films for the adhesive tapes of the invention are preferably corona- and/or flame-pretreated on the adhesive-facing side in order to obtain sufficient anchoring of the adhesive on the film. The surface tensions obtained in these operations are situated in particular between 35 and 47 mN/m and preferably between 38 and 45 mN/m.

The uncoated side can be surface treated prior to coating, directly after coating, or else in a separate workstep: for example, during slitting and rewinding. The surface treatment of the uncoated side takes place preferably after coating. Preference is given to a corona pretreatment which produces a surface tension, measured using standard commercial test inks, of from 30 to 45 mN/m, more preferably from 35 to 40 mN/m, and with particular preference from 36 to 38 mN/m. Likewise possible is a surface treatment by means of flaming.

The application rate of the adhesive layer is from 10 to 45 g/m$^2$. In one preferred embodiment, an application rate of 18 to 35 g/m$^2$, with particular preference 18–28 g/m$^2$, is set.

Acrylic dispersions (b.1) are known and are employed both for adhesive tapes and for adhesives for labels, in large quantities. The acrylic dispersions comprise particles of acrylic polymers which are in disperse distribution in the aqueous phase of the dispersion. Acrylic dispersions are normally prepared in aqueous medium by polymerizing suitable monomers. The preparation can be carried out either as a batch operation or by metering in one or more of the components during the polymerization. In the case of the batch process, all of the components needed are introduced at the same time.

The properties of the acrylic dispersions and of the corresponding adhesives are determined predominantly by the selection of the monomers and by the molecular weight obtained. The most important monomers are n-butyl acrylate, 2-ethylhexyl acrylate and acrylic acid. Suitable monomer units are described in "Acrylic Adhesives", Donatas Satas in Handbook of Pressure Sensitive Adhesive Technology, Second Edition, edited by Donatas Satas, Van Nostrand Reinhold New York, pp. 396–456.

The acrylic dispersions of the invention comprise in particular 0 to 10% of acrylic acid units
0 to 100% of n-butyl acrylate units
0 to 100% of 2-ethylhexyl acrylate units In one preferred embodiment, acrylic dispersions containing from 0.5 to 3% of acrylic acid units are used. In another preferred embodiment, acrylic dispersions containing from 0.5 to 3% of acrylic acid units and 99.5 to 90%, with particular preference 99.5 to 96%, of n-butyl acrylate units are used. Another example of acrylic dispersions of the invention are acrylic dispersions containing 80–90% of 2-ethylhexyl acrylate units and from 8 to 20% of n-butyl acrylate units.

The acrylic dispersions may further comprise additional monomer units by means of which, for example, the glass transition temperature and crosslinkability can be controlled. Examples include methyl acrylate, ethyl acrylate, methyl ethyl acrylate, maleic anhydride, acrylamide, glycidyl methacrylate, isopropyl acrylate, n-propyl acrylate, isobutyl acrylate, n-octyl acrylate, and the methacrylates corresponding to these acrylates. The acrylic dispersions normally contain 0–10% of these additional monomer units; either only one additional monomer unit is used, or mixtures thereof are used.

The glass transition temperature obtained depends on the monomers used. The acrylic dispersions used for the adhesives of the invention have glass transition temperatures in the dried state of in particular between −80 and −15° C., preferably between −75 and −25° C., and with particular preference between −55 and −35° C.

The solids content of the acrylic dispersions is situated in particular between 30 and 70% by weight, preferably between 45 and 60% by weight.

By way of example, mention may be made of the acrylic dispersions Primal PS 83d and Primal PS PS 90 from Rohm & Haas.

Special acrylic dispersions b.2 are known and are used, inter alia, for impregnating leather. For instance, Henkel according to EP 17119 uses such acrylic dispersions in dry-bright shoe polishes and leathercare compositions.

The special acrylic dispersions comprise particles of acrylic polymers which are in disperse distribution in the aqueous phase of the dispersion. Acrylic dispersions are normally prepared in an aqueous medium by polymerizing suitable monomers. The preparation may take place either by means of a batch process or else by metering in one or more components during the polymerization. In the case of the batch process, all of the components needed are introduced simultaneously.

The properties of acrylic dispersions and of the corresponding adhesives are determined predominantly by the selection of the monomers and by the molecular weight obtained.

The most important monomers are n-butyl acrylate, ethyl acrylate, methyl methacrylate, and acrylic acid. Further monomers suitable for use for nonadhesive acrylic dispersions are preferably copolymerized as optional additional monomers together with the esters of acrylic acid and/or methacrylic acid. Examples are acrylamide, glycidyl methacrylate, hydroxyethyl methacrylate, dimethylaminoethyl methacrylate, vinyl acetate, styrene, and maleic anhydride. Such dispersions are described for example in EP 0375215 B1 to ICI.

If desired, the dispersion may include further additives, such as fillers, for example, or crosslinking agents. Suitable crosslinking agents may be epoxy resins, amine derivatives such as hexamethoxymethylmelamine, for example, and/or condensation products of an amine, melamine for example, or urea with an aldehyde, formaldehyde for example. In order to obtain nonadhesive polyacrylate dispersions it has been found advantageous to add further substances where appropriate which react, for example, with the carboxyl groups of the polymer. Examples of these are aziridines, such as ethyleneimine, propyleneimine.

The special acrylic dispersion of the invention, derived from 3 acrylic monomers, comprises:

65–84% by weight of ethyl acrylate units
15–34% by weight of methyl methacrylate units
0.5–2% by weight of acrylic acid units
0.1–1% by weight of propyleneimine units An example that may be mentioned of a special acrylic dispersions (b.2) is Neo Cryl A 45 from Zeneca Resins (Netherlands).

Set out below are the typical properties of the Neo Cryl A 45 acrylic dispersion:

| Type: | anionic modified acrylic copolymer dispersion |
|---|---|
| Size: | 37% |
| pH (25° C.): | 9.5% |
| Viscosity, Brookfield 25° C.: | 25 mPa · s |
| $T_g$ (DSC): | 15° C. |

The adhesives used for preparing the adhesive tapes of the invention may comprise further components provided they are chosen so as not to impair the properties according to the invention (particularly tack and water insensitivity). Examples are resins, plasticizers, colorants, defoamers, and thickeners, and further adjuvants for setting the desired rheological properties. Modifications of acrylic dispersions are known and are described, for example, in "Modification of Acrylic Dispersions", Alexander Zettlin Handbook of Pressure Sensitive Adhesive Technology, Second Edition, edited by Donatas Satas, Van Nostrand Reinhold New York, pp. 457–493.

Aqueous resin dispersions, i.e. dispersions of resin in water, are known. Preparation and properties are described, for example, in "Resin Dispersions", Anne Z. Casey in Handbook of Pressure Sensitive Adhesive Technology, Second Edition, edited by Donatas Satas, Van Nostrand Reinhold New York, pp. 545–566.

Dispersions of hydrocarbon resins and modified hydrocarbon resins are likewise known and are supplied, for example, by Hercules BV under the trade name Tacolyn (example: Tacolyn 4177).

Suitable resin dispersions are those based on hydrocarbon resins or modified hydrocarbon resins with a softening point of between 50 and 100° C. The adhesive may comprise, for example, 5–28% by weight of the resin dispersions. The solids content of the resin dispersions is normally between 40 and 70%.

In accordance with the state of the art, resin dispersions based on mixtures of different hydrocarbon resins, and also on mixtures of hydrocarbon resins with other known resins, may be added to the adhesive of the invention provided such addition is not detrimental to the characteristic pattern of properties (especially tack and water insensitivity) of the adhesive of the invention. Possible, for example, are mixtures of hydrocarbon resins with small amounts of resins based on rosin or modified rosin or phenolic resins, other natural resins, resin esters or resin acids.

The adhesive of the invention may further be admixed with plasticizing components such as plasticizer resins, liquid resins, oils or other known components such as alkoxylated alkylphenols, for example. Alkoxylated alkylphenols are known and are described, for example, in U.S. Pat. No. 4,277,387 and EP 6571. The use of alkoxylated alkylphenols as plasticizers has been proposed, inter alia, in "Modification of Acrylic Dispersions", Alexander Zettl in Handbook of Pressure Sensitive Adhesive Technology, Second Edition, edited by Donatas Satas, Van Nostrand Reinhold New York, p. 471.

The properties of the alkoxylated alkylphenols are determined by the alkyl radical and, predominantly, by the structure of the polyglycol ether chain. During preparation, both ethylene oxide and propylene oxide can be used. In one particular embodiment, propoxylated alkylphenol is used. Preference is given to water-insoluble alkoxylated alkylphenols. Preference is further given to alkoxylated alkylphenols having a boiling point of more than 100° C., preferably more than 130° C., and with particular preference more than 200° C.

By using crosslinkers, the adhesive of the invention can be optimized in the direction of higher shear strength. The selection and proportion of the crosslinkers are known to the skilled worker and can be determined by means of appropriate tests. Crosslinkers for acrylic dispersions are known fundamentally and are described, for example, in "Acrylic Adhesives", Donatas Satas in Handbook of Pressure Sensitive Adhesive Technology, Second Edition, edited by Donatas Satas, Van Nostrand Reinhold New York, pp. 411–419.

Crosslinkers based on isocyanate are suitable in principle but are not preferred owing to the limited potlives and to the increased complexity in terms of workplace safety. One example of an isocyanate-based crosslinker is Basonat F DS 3425 X (BASF).

Isocyanate-free crosslinkers are preferred, examples being crosslinkers based on salts of multifunctional metals. These are known in principle and are described, for example, in U.S. Pat. No. 3,470,366 (1973), U.S. Pat. No. 3,900,610 (1975), U.S. Pat. No. 3,770,780 (1973), and U.S. Pat. No. 3,790,553 (1974). Particularly suitable are crosslinkers based on zinc complexes which are able to form covalent and/or complexlike bonds with carboxyl groups.

The adhesive tapes may be produced by known methods. An overview of customary production methods can be found, for example, in "Coating Equipment", Donatas Satas in Handbook of Pressure Sensitive Adhesive Technology, Second Edition, edited by Donatas Satas, Van Nostrand Reinhold New York, pp. 767–808. The known methods of drying and slitting the adhesive tapes can likewise be found in the Handbook of Pressure Sensitive Adhesive Technology, pages 809–874.

The coating of the films with dispersion adhesives is preferably carried out using wire doctor systems set so as to give the desired application rate. The subsequent drying of the coated film takes place in particular in a drying tunnel operated with hot air. In principle, additional drying by means of infrared lamps is also possible.

The dried films are subjected to a surface treatment, preferably by means of corona discharge, on the reverse, which is not being coated with adhesive. The surface treatment must be as uniform as possible. In the course of this treatment a surface tension, measured using standard commercial test inks, of between 30 and 45 mN/m, preferably of between 35 and 40 mN/m, and with particular preference between 36 and 38 mN/m, is achieved.

As far as possible, the rolls of adhesive tape must be wound up with uniform tension and uniform applied pressure. Optimization in winding is dependent on the equipment used and is known to the skilled worker. The conditions during winding should be set so as to provide for sufficiently quiet unwind of the adhesive tape roll.

The adhesive tape may be prepared from components b.1., b.2, and, where appropriate, further components in a separate operation prior to coating or else by means of automatic mixers immediately prior to coating.

As compared with known adhesive tapes with polyolefin backings and acrylic-dispersion-based adhesive, the adhesive tapes of the invention exhibit a markedly improved moisture resistance in conjunction with quiet unwind even at high unwind speeds of, for example, 120 m/min. Additionally, as compared with known adhesive tapes with polyolefin backing and acrylic-dispersion-based adhesive, the adhesive tapes of the invention exhibit good bond strength and good shear strength.

By means of these improvements, detailed above, it is possible to overcome the known weaknesses of the known adhesive tapes with polyolefin backing and acrylic dispersion. With the adhesive tapes of the invention it is possible in particular to obtain much better results in the sealing of cartons.

Furthermore, the adhesive tapes of the invention can be printed with commercially customary printing inks, with the substantial advantage over known adhesive tapes with polyolefin backing and acrylic-dispersion-based adhesive that the adhesive tapes of the invention can be printed without addition of surface activation during printing. This significantly simplifies the printing operation.

The parameters specified in the examples were determined by means of the following measurement techniques.

The water content of the adhesive is determined by the known method of Karl Fischer. In this method, a known amount of the adhesive is heated and the water expelled during heating is determined by means of titration using the Karl Fischer reagent.

To determine the application rate, a circular specimen of known surface area is cut from the coated film and weighed. Then the adhesive is removed by detachment with acetone and the film, now free of adhesive, is weighed again. The application rate in $g/m^2$ is calculated from the difference.

The unwind force is measured at a constant unwind speed of 30 m/min by measuring the torque and calculating the unwind force, in N/cm, using the known formulae.

The unwind noise is determined while the adhesive tape is unwound at a speed of 60, 120, and 180 m/min. The unwind noise is measured in dB(A) at a distance of 10 cm from the center of the roll of adhesive tape, using a standard commercial sound level meter from Brüel & Kjear (type 2226). A measured sound level less than 84 dB(A) is classed as "quiet".

The measurement of the bond strength to steel is carried out in accordance with DIN EN 1939 along the lines of AFERA 4001.

The moisture resistance of adhesive tapes is determined by storing finished rolls of adhesive tape in a Weiss SB 11160/40 controlled-climate cabinet at 20° C. and 90% relative humidity. After a defined storage time (3 days; 20 days) under these conditions, the rolls of adhesive tape are unwound. Rolls which during this operation exhibit no transfer of adhesive to the reverse are classed as being moisture resistant.

EXAMPLES a. Film

A biaxially oriented, matte polypropylene film is used, Radil TM from Radici (Italy):

| | |
|---|---|
| Thickness: | 35 μm |
| Weight per unit area: | 32 g/m² |
| Tensile strength, MD: | 150 N/mm² |
| Tensile strength, CD: | 270 N/mm² |
| Elongation at break, MD: | 150% |
| Elongation at break, CD: | 50% |

The surface tension of the film surface coated with the adhesive is 39 mN/m. The opposite surface of the film, which is not coated with the adhesive, is also additionally treated by means of corona techniques after coating, with the result that a surface tension of 37 mN/m is measured.

b. Components of the Adhesive b.1: Acrylic polymers from aqueous acrylic dispersion from Rohm & Haas with the designation Primal PSS83D (solids content: 53% by weight; ammonia content <0.2% by weight; pH 9.1–9.8)

b.2: Special acrylic dispersion from Zeneca Resins with the designation Neo Cryl A 45 c. Preparation of the Adhesive

The adhesive coating was prepared as follows:

c.1. The Neo Cryl A 45 (b.2) is added to the acrylic dispersion b.1 at 23° C. with continuous stirring with a customary mechanical stirrer. It is followed by further thorough stirring for 10 minutes.

c.2. Coating takes place within a period of from 10 minutes to 2 hours.

d. Coating

The film a. is coated with the adhesive by means of a wire doctor. The wire doctor and the coating speed are set such that, after the coated film has been dried, an application rate of approximately 24 g/m² is measured. Coating speed and dryer output are set so that, after drying, a water content of from 0.03 to 0.13% by weight is measured in the adhesive.

Coating took place in a laboratory coating unit with a working width of 500 mm and a coating speed of 10 m/min. Downstream of the coating station with wire doctor applicator there is a drying tunnel which is operated with hot air (about 105° C.). After coating, the coated film was converted to give standard adhesive rolls with a width of 50 mm. In the course of this operation, the surface of the film not coated with adhesive is treated by means of corona discharge, so that thereafter a surface tension of 37 mN/m is measured using standard commercial test inks. The properties were determined following storage at 23° C. for three days.

e. Adhesive Formulations

The following adhesive formulations were used, For all components, the amounts in % by weight are based on the solids content.

| | |
|---|---|
| Test A: | 100% by weight of acrylic dispersion b.1 |
| Test B: | 95% by weight of acrylic dispersion (b.1) |
| | 5% by weight of Neocryl A 45 (b.2) |

Results

| Property | Test A not inventive | Test B inventive |
|---|---|---|
| Water content of the adhesive [g/m²] | 0.05 | 0.09 |
| Adhesive application rate [g/m²] | 23.1 | 23.3 |
| Bond strength to steel [N/cm[ | 2.4 | 2.6 |
| Unwind force at 30 m/min [N/mm] | 2.8 | 2.7 |
| Unwind noise at 60 m/min | quiet | quiet |
| Unwind noise at 120 m/min | noisy | quiet |
| Unwind noise at 180 m/min | noisy | quiet |
| Moisture resistance after 3 d 20° C. and 90% relative humidity | 100% adhesive transfer | 0% adhesive transfer |
| Moisture resistance after 20 d 20° C. and 90% relative humidity | 100% adhesive transfer | 0% adhesive transfer |

We claim:

1. A solvent-free adhesive tape comprising a polyolefin film with from 10 to 45 g/m² of an adhesive coating formed from a mixture of
   a) an adhesive acrylic dispersion A and
   b) an acrylic dispersion B comprising:
      65–84% by weight of ethyl acrylate units
      15–34% by weight of methyl methacrylate units
      0.5–2% by weight of acrylic acid units, and
      0.1–1% by weight of propyleneimine units,
the quantitative ratio between adhesive acrylic dispersion A and acrylic dispersion B in said mixture being between 99:1 and 90:10, said mixture further comprising from 0–30% by weight of additives which do not alter the adhesive properties of the adhesive coating.

2. The solvent-free adhesive tape according to claim 1, wherein said adhesive coating is applied in an amount of 18 to 35 g/m².

3. The solvent-free adhesive tape according to claim 1 wherein the film is a biaxially oriented polyolefin based on polypropylene.

4. The solvent-free adhesive tape according to claim 3, wherein said film has a thickness of between 20 and 100 μm.

5. The solvent-free adhesive tape according to claim 1, wherein the film is formed of biaxially oriented, multilayer polyolefin films based on polypropylene having a matte-finished surface.

6. The solvent-free adhesive tape according to claim 5, wherein said film has a thickness of between 15 and 50 μm.

7. A method of sealing a package, which comprises sealing said package with the solvent-free adhesive tape of claim 1.

8. The solvent-free adhesive tape of claim 1 comprising a printing applied to the surface thereof in the absence of surface activation.

9. A solvent-free adhesive tape comprising a polyolefin film coated with an acrylic adhesive composition comprised of a polymer A having 0.5 to 3% acrylic acid units and 99.5 to 90% n-butyl acrylate units and a polymer B having 65–84% by weight of ethyl acrylate units, 15–34% by weight of methyl methacrylate units, 0.5–2% by weight of acrylic acid units, and 0.1–1% by weight of propyleneimine units, the weight ratio of polymer A to polymer B in said adhesive composition being between 99:1 and 90:10.

10. The solvent-free adhesive tape according to claim 1, wherein said adhesive acrylate dispersion A comprises 0.5 to 3% acrylic acid units and 99.5 to 90% n-butyl acrylate units.

11. A solvent-free adhesive tape comprising a polyolefin film coated with an acrylic adhesive composition comprised of a polymer A having 80 to 90% of 2-ethylhexyl acrylate acid units and 8 to 20% n-butyl acrylate units and a polymer B having 65–84% by weight of ethyl acrylate units, 15–34% by weight of methyl methacrylate units, 0.5–2% by weight of acrylic acid units, and 0.1–1% by weight of propyleneimine units, the weight ratio of polymer A to polymer B in said adhesive composition being between 99:1 and 90:10.

* * * * *